(12) United States Patent
Grimm et al.

(10) Patent No.: US 7,517,380 B2
(45) Date of Patent: Apr. 14, 2009

(54) SERVICEABLE ALIGNED EXHAUST AFTERTREATMENT ASSEMBLY

(75) Inventors: David M. Grimm, Verona, WI (US); Jeffrey T. Sedlacek, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 432 days.

(21) Appl. No.: 11/340,174

(22) Filed: Jan. 26, 2006

(65) Prior Publication Data

US 2007/0169452 A1 Jul. 26, 2007

(51) Int. Cl.
*B01D 46/00* (2006.01)

(52) U.S. Cl. .................. 55/523; 55/385.3; 55/495; 55/503; 55/524; 55/DIG. 5; 55/DIG. 10; 55/DIG. 30; 95/273; 60/297; 60/299; 60/311; 422/177; 422/180; 181/213; 180/89.2

(58) Field of Classification Search ............... 55/282.2, 55/282.3, 385.3, 495, 503, 523, 524, DIG. 5, 55/DIG. 10, DIG. 30; 95/273; 60/274, 295, 60/297, 299, 309, 311; 422/177, 180; 181/207, 181/213, 217; 180/89.2

See application file for complete search history.

(56) References Cited

U.S. PATENT DOCUMENTS

| | | | |
|---|---|---|---|
| 2,273,210 A | 2/1942 | Lowther et al. | |
| 2,446,631 A | 8/1948 | Burks | |
| 2,482,577 A | 9/1949 | Dahlstrom | |
| 2,721,619 A | 10/1955 | Cheairs | |
| 2,732,092 A | 1/1956 | Lawrence | |
| 2,732,913 A | 1/1956 | Higgins | |
| 2,921,432 A | 1/1960 | Marcotte et al. | |
| 3,078,650 A | 2/1963 | Anderson et al. | |
| 3,423,909 A | 1/1969 | Bennett et al. | |
| 3,616,618 A | 11/1971 | Gronholz et al. | |
| 3,817,221 A | 6/1974 | Nohira et al. | |
| 3,834,134 A | 9/1974 | McAllister | |
| 4,020,783 A | 5/1977 | Anderson et al. | |
| 4,032,310 A * | 6/1977 | Ignoffo | 60/311 |
| 4,197,098 A * | 4/1980 | Stiehl et al. | 55/503 |
| 4,278,455 A | 7/1981 | Nardi | |
| 4,312,651 A | 1/1982 | Easki et al. | |
| 4,367,081 A * | 1/1983 | Harvey | 55/503 |
| 4,378,983 A | 4/1983 | Martin | |
| 4,450,934 A | 5/1984 | Davis | |
| 4,488,889 A | 12/1984 | McCarroll | |
| 4,527,659 A | 7/1985 | Harrington | |
| 4,629,226 A | 12/1986 | Cassel et al. | |
| 4,702,509 A | 10/1987 | Elliott, Sr | |
| 5,169,604 A * | 12/1992 | Crothers, Jr. | 422/180 |
| 5,170,020 A | 12/1992 | Kruger et al. | |
| 5,203,166 A * | 4/1993 | Miller | 60/297 |
| 5,470,364 A * | 11/1995 | Adiletta | 55/523 |
| 5,570,861 A * | 11/1996 | Olsen et al. | 181/207 |

(Continued)

FOREIGN PATENT DOCUMENTS

GB 882647 11/1961

(Continued)

*Primary Examiner*—Jason M Greene
(74) *Attorney, Agent, or Firm*—Andrus, Sceales, Starke & Sawall, LLP; J. Bruce Schelkopf

(57) ABSTRACT

An exhaust aftertreatment system and method enables servicing by a single technician and provides singular location mounting and alignment.

24 Claims, 9 Drawing Sheets

U.S. PATENT DOCUMENTS

| | | | |
|---|---|---|---|
| 6,244,552 B1 * | 6/2001 | Adams et al. | 248/274.1 |
| 6,584,768 B1 * | 7/2003 | Hecker et al. | 55/385.3 |
| 6,632,406 B1 * | 10/2003 | Michelin et al. | 422/180 |
| 6,824,743 B1 | 11/2004 | Pawson et al. | |
| 2002/0194996 A1 | 12/2002 | Peter et al. | |
| 2006/0191247 A1 * | 8/2006 | Thaler | 55/523 |

FOREIGN PATENT DOCUMENTS

| | | |
|---|---|---|
| GB | 02 919 378 | 6/1979 |
| JP | 358202323 A | 11/1983 |
| JP | 411072018 | 3/1999 |

* cited by examiner

SERVICEABLE ALIGNED EXHAUST AFTERTREATMENT ASSEMBLY

BACKGROUND AND SUMMARY

The invention relates to exhaust aftertreatment assemblies.

Various exhaust aftertreatment assemblies require removal and servicing of an aftertreatment element, e.g. a particulate soot filter element and/or a catalyst element. For example, in the case of diesel engine emissions, a particulate soot filter element needs to be serviced after it builds up a certain amount of ash. One system for accomplishing this is to make the element removable from the exhaust aftertreatment assembly, and then cleaned remotely. Sections of the assembly are moved away from the filter element section and manually held by one technician, while another technician removes the filter element section.

The present invention rose during continuing development efforts relating to the above assemblies. In one aspect, the present system requires only one technician to accomplish the task of separating assembly housing sections and removing an aftertreatment element section for servicing. In another aspect, a system is provided facilitating orientation and alignment of sensors and ports in assembled housing sections relative to mounting structure, which is desired in certain applications including certain vehicle applications.

DETAILED DESCRIPTION

Figure 1:
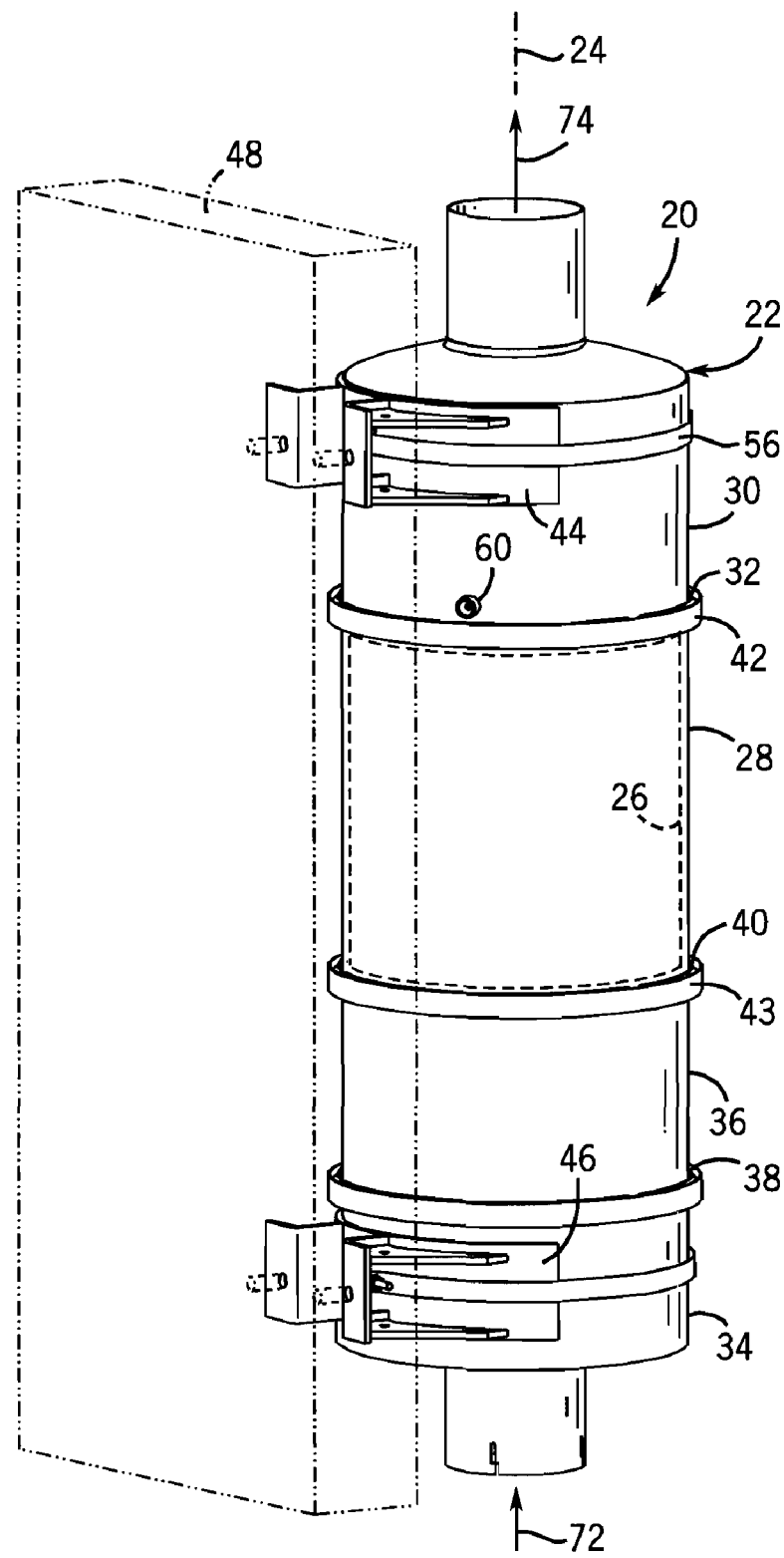
FIG. 1 is a perspective view of an exhaust aftertreatment assembly constructed in accordance with the invention.

FIG. 1 shows an exhaust aftertreatment assembly 20 including an axially extending housing 22 extending along a longitudinal axis 24 and containing an aftertreatment element 26, for example a particulate soot filter element and/or a catalyst element. The housing has a plurality of sections including an aftertreatment element section 28 and an adjacent mounting section 30 separable from section 28 at a service joint 32 therebetween, and has other housing sections such as 34, 36 connected at 38, 40 as desired for a particular installation. The respective housing sections are connected at respective band clamps such as 42 or the like, as is known. A pair of brackets 44 and 46, FIGS. 1, 3, support the housing on support structure, shown schematically at 48, which for example may be part of a vehicle, for example the rear vertical wall of the cab of a truck. Bracket 44 is mounted to mounting section 30 at an interface guide track assembly 50, FIGS. 3-7, supporting mounting section 30 at a first position, FIGS. 4, 5, relative to aftertreatment element section 28 and in engagement with section 28 at service joint 32. The interface guide track assembly supports mounting section 30 at a second position relative to section 28, FIGS. 7-9, and separated from section 28 to permit servicing of the latter, FIG. 9.

Figure 4:
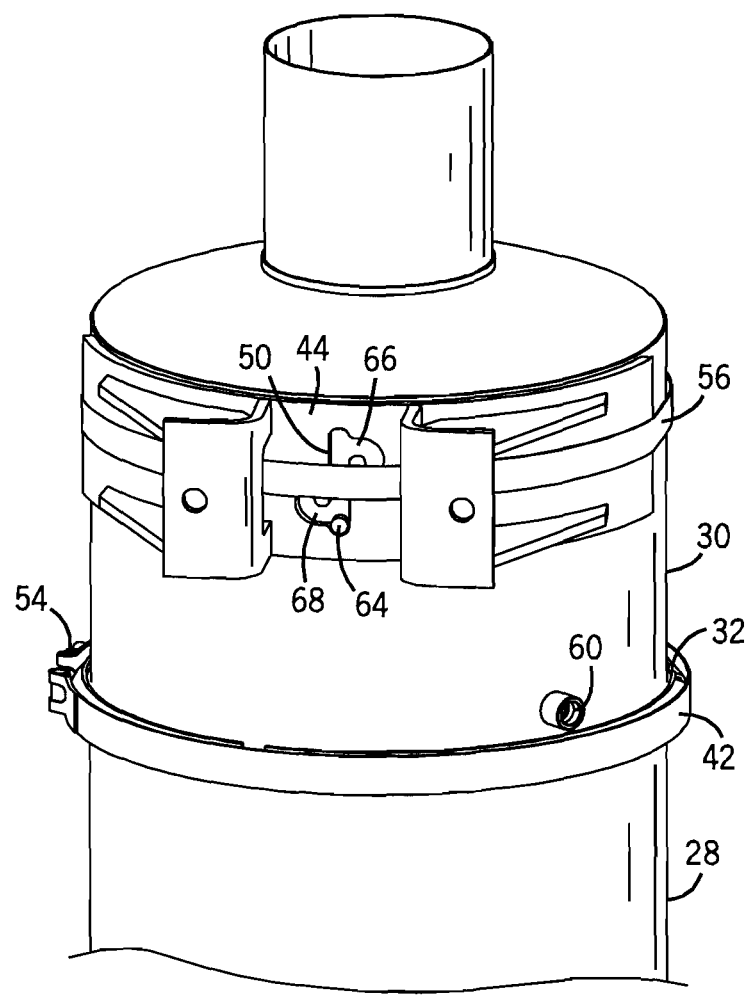
FIG. 4 is an enlarged view of a portion of FIG. 1.

Clamp 42 is a band clamp tightenable and loosenable at a captive circumferential screw such as 54, FIG. 4, as is known. The clamp has a tightened condition securing mounting section 30 and aftertreatment element section 28 to each other at service joint 32 in the noted first position of mounting section 30, FIGS. 1, 4, 5. The clamp has a loosened condition permitting separation of mounting section 30 and aftertreatment element section 28 at service joint 32 in the noted second position of mounting section 30, FIGS. 6-9. Mounting section 30 is tightened to bracket 44 by a band clamp 56 which is tightenable and loosenable by a captive screw 58, FIG. 8. Band clamp 56 is loosened to permit movement of mounting section 30 between the noted first and second positions, i.e. upwardly and downwardly in the Figures. Mounting bracket 44 supports both mounting section 30 and aftertreatment element section 28 in the noted first position of mounting section 30, i.e. the downward position of mounting section 30, FIGS. 1, 4, 5. Bracket 44 supports mounting section 30 but not aftertreatment element section 28 in the noted second position of mounting section 30, i.e. the upward position, FIGS. 7-9.

Mounting section 30 is movable between the noted first and second positions in the loosened condition of clamps 42 and 56. The noted first position of mounting section 30, i.e. the downward position in FIGS. 1, 4, 5, locates, mounting section 30 longitudinally along axis 24 and also locates mounting section 30 laterally relative to axis 24, e.g. at a singular rotated angular position relative thereto, to provide singular location mounting and alignment of mounting section 30, particularly the circumferential perimeter thereof, relative to support structure 48 by a single technician without assistance of a second technician. This is significant because the perimeter of mounting section 30 may include sensors or ports such as 60 which in some installations need to be aligned with a complemental connection or the like of the support structure 48 or a vehicle. The noted second position of mounting section 30, FIGS. 7-9, supports mounting section 30 independently of aftertreatment element section 28 and permits removal of the latter by the single technician without manual holding of mounting section 30 by such single technician and without the assistance of a second technician.

Figure 2:
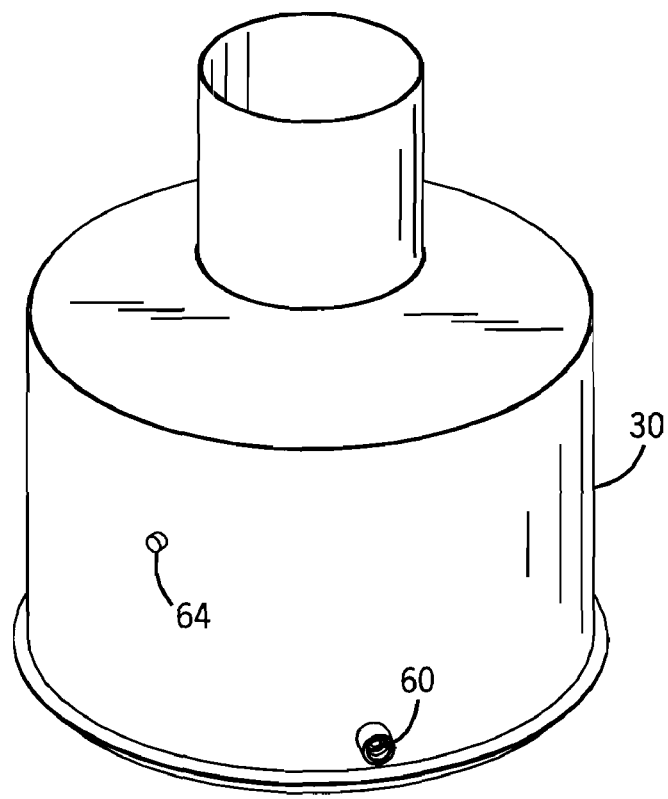
FIG. 2 is an enlarged view of a component of FIG. 1.
Figure 6:
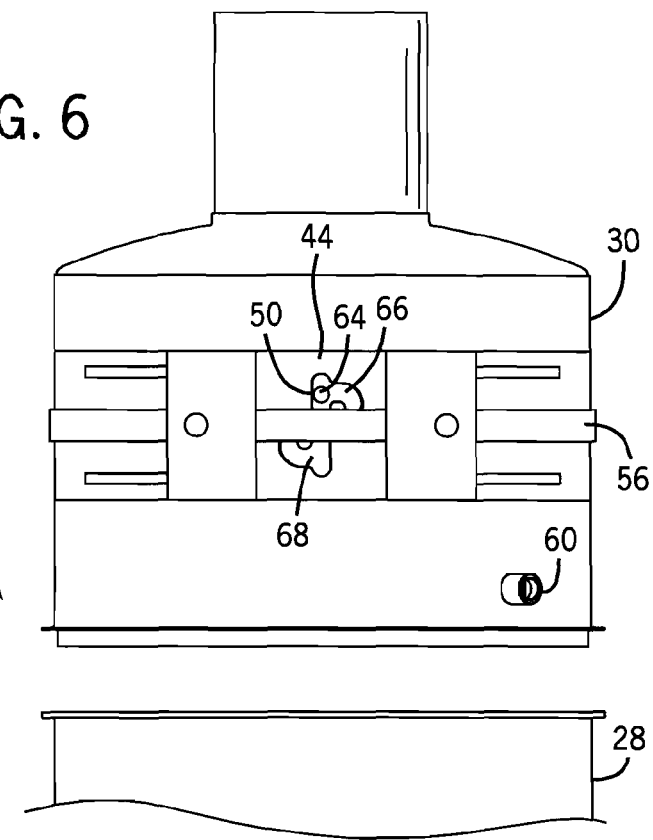
FIG. 6 is like FIG. 5 and illustrates a servicing step.
Figure 7:
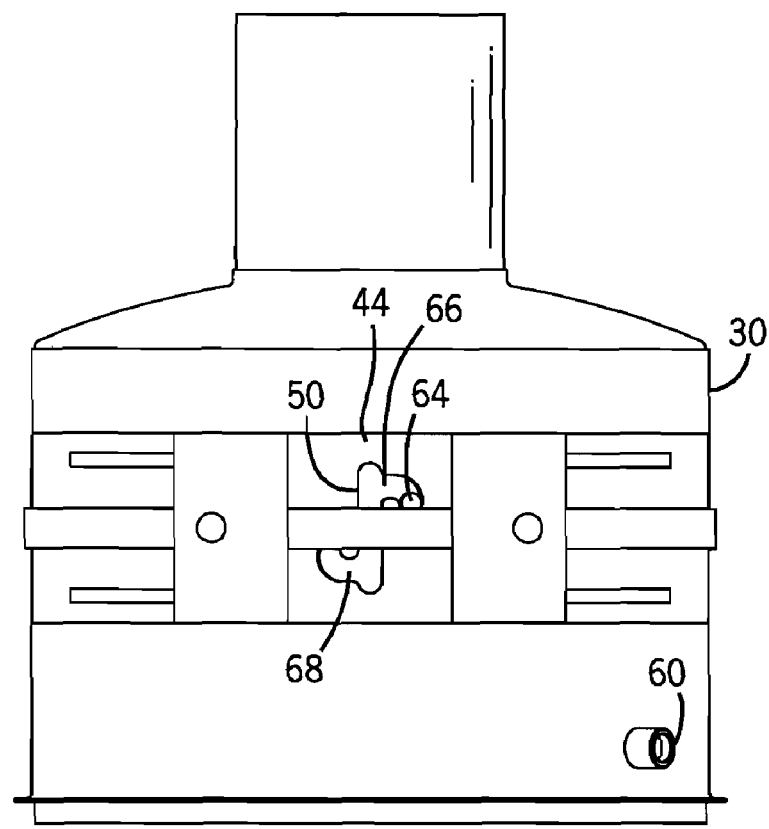
FIG. 7 is like FIG. 6 and further illustrates a servicing step.
Figure 8:
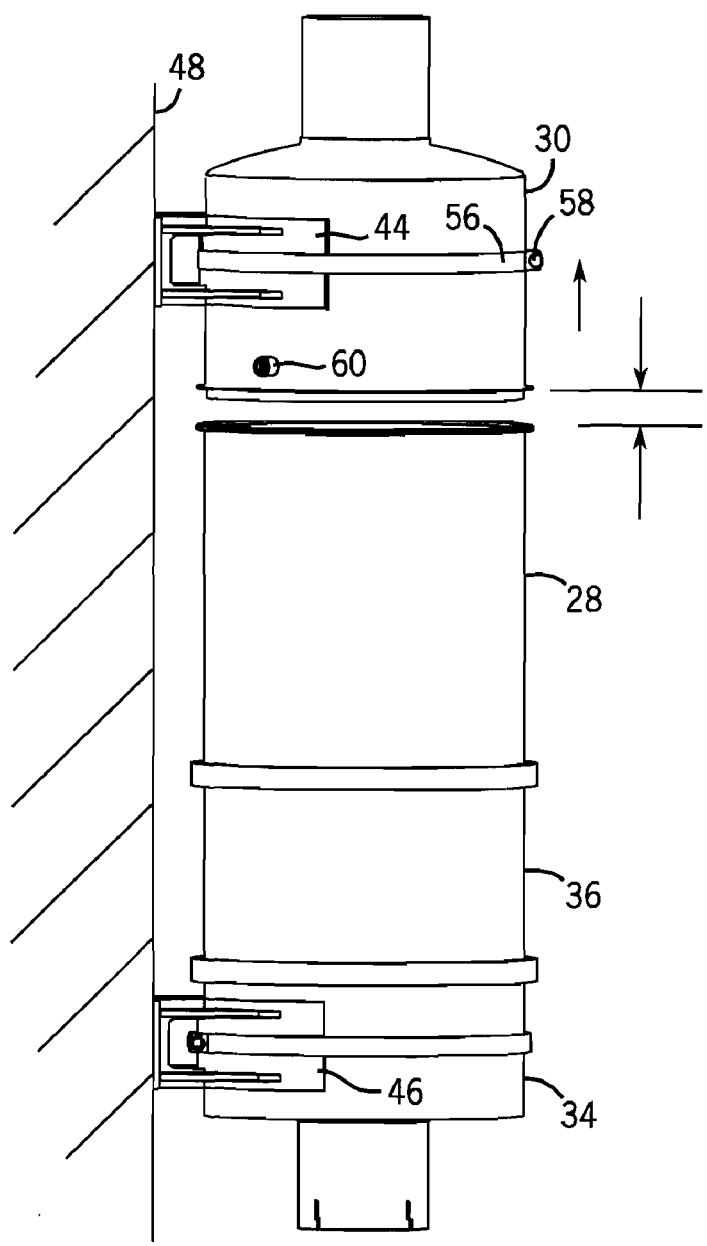
FIG. 8 is a side elevation view of the structure of FIG. 1 and illustrates a servicing step.
Figure 9:
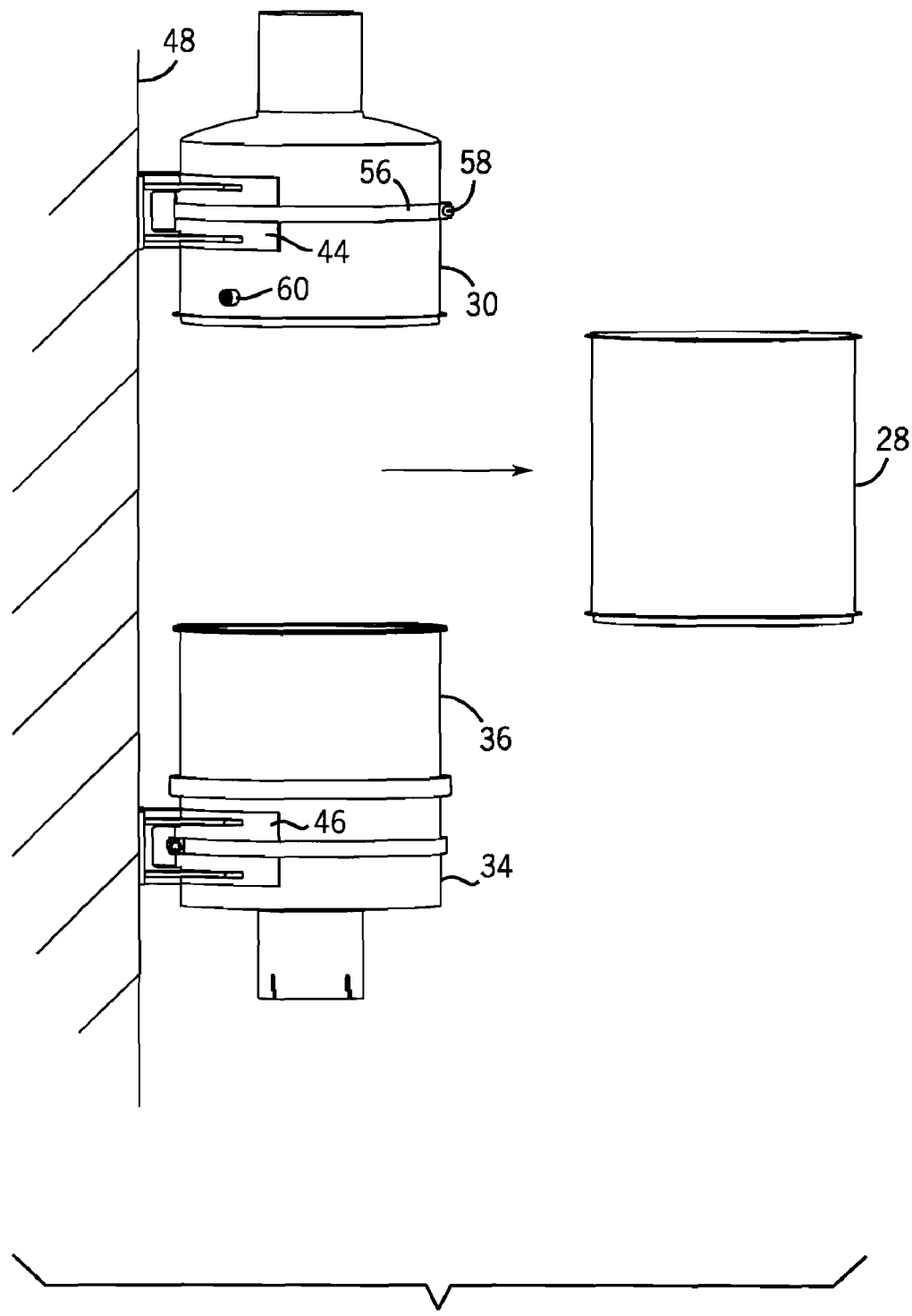
FIG. 9 is like FIG. 8 and further illustrates a servicing step.

In the Figures, mounting section 30 is vertically spaced above aftertreatment element section 28 in the noted second position of the mounting section, FIGS. 7-9. Guide track assembly 50 includes a slot 62, FIG. 3, on bracket 44, and a tab 64, FIG. 2, on mounting section 30. Tab 64 extends laterally of longitudinal axis 24 and into slot 62. The slot has an upper segment 66 spaced above a lower segment 68. The upper and lower segments are joined by a span 70 therebetween. Lower segment 68 receives tab 64 in the noted first position of mounting section 30, FIGS. 4, 5. Upper segment 66 receives tab 64 in the noted second position of mounting section 30, FIGS. 6, 7. The lateral height of tab 64 is preferably less than the lateral thickness of bracket 44 at slot 62 to enable tab 64 to move vertically along span 70 beneath band clamp 56, with the latter being slightly loosened to enable up-down movement of mounting section 30. Bracket 46 and housing section 34 may also include a comparable slot and tab arrangement if desired to enable up-down movement of section 34 and separation from section 36. The arrangement shown in FIG. 1 is typical for an over the road diesel truck, namely a vertical exhaust having a lower inlet housing section 34 receiving exhaust as shown at arrow 72, and an upper outlet housing section 30 discharging the exhaust as shown at arrow 74, though other arrangements may be used.

FIGS. 10-18 show various slot embodiments.

Figure 3:
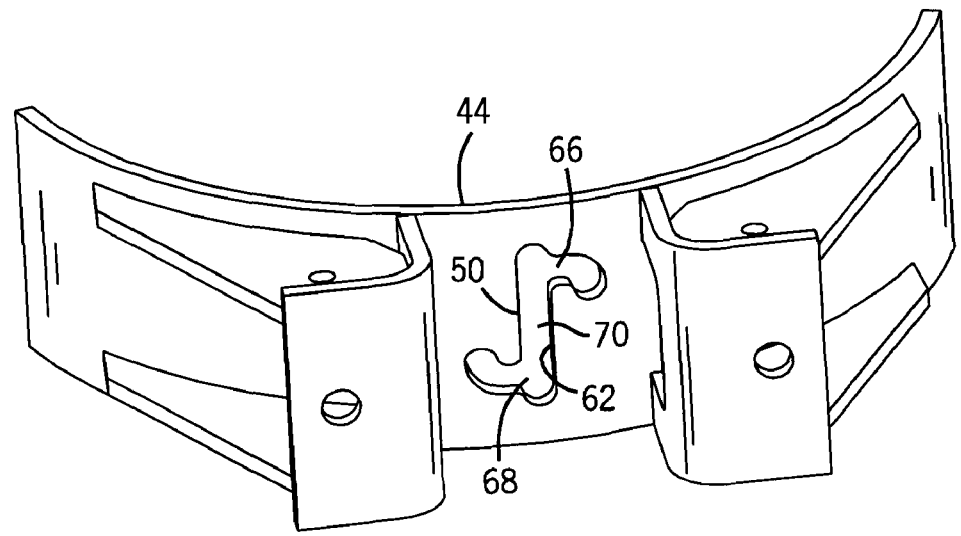
FIG. 3 is an enlarged view of another component of FIG. 1.
Figure 10:
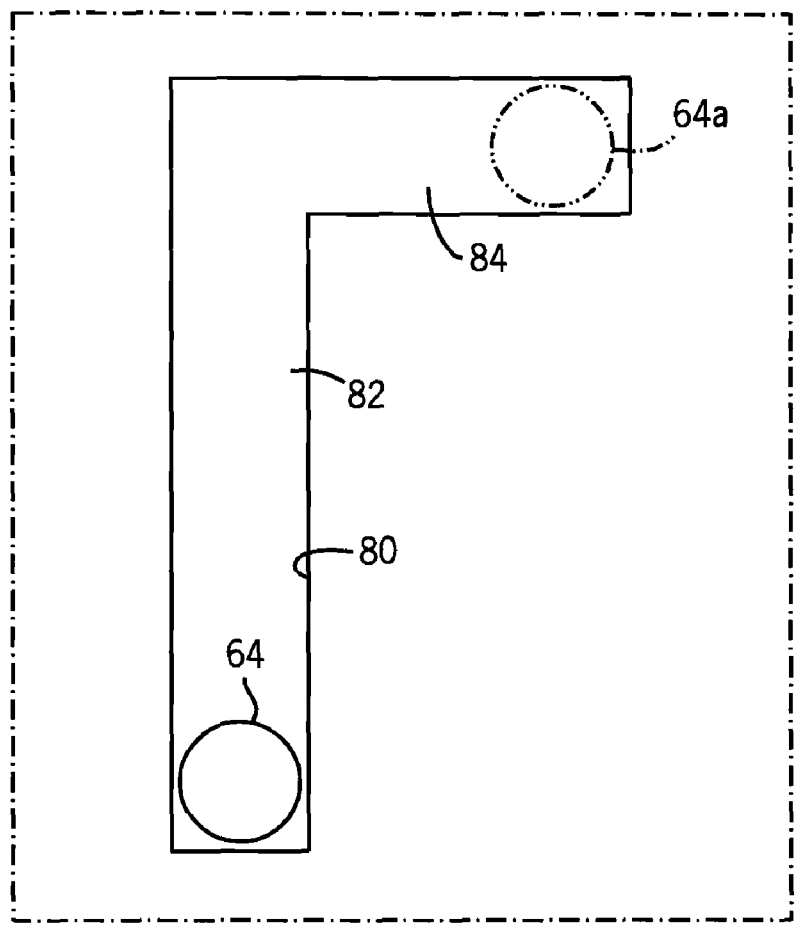
FIG. 10 is an enlarged schematic view like a portion of FIG. 5 and shows a further embodiment.

Slot 80, FIG. 10, and the right hand portion of slot 62, FIG. 3, have an inverted L-shape including a longitudinally extending first leg 82 providing the noted span 70, and a laterally extending second leg 84 providing the noted upper segment 66. Tab 64 is received at the bottom of leg 82 in the noted first position of mounting section 30, FIGS. 1, 4, 5, as shown in solid line at 64 in FIG. 10. As shown in FIG. 10 at dashed-in tab 64a, the tab is received at the lateral end of second leg 84 distally opposite the top of first leg 82 in the noted second position of mounting section 30, FIGS. 7-9.

Figures 11, 12:
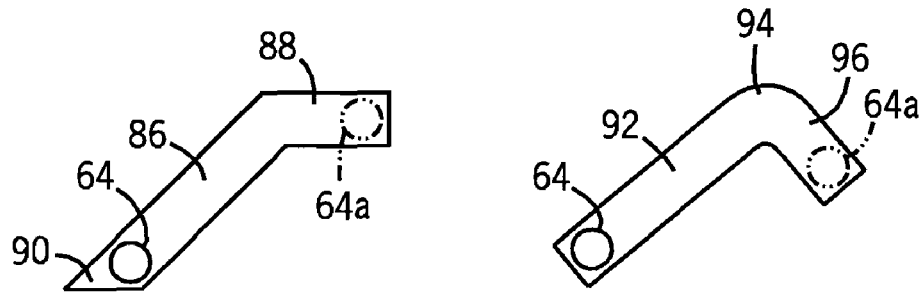
FIG. 11 is a schematic view like a portion of FIG. 5 and shows a further embodiment.
FIG. 12 is like FIG. 11 and shows a further embodiment.

In FIG. 11, the noted span extends diagonally as shown at 86 between upper and lower segments 88 and 90. The diagonal span has a lower end at a corner at 90 providing the noted lower segment receiving the tab in the noted first downward position of mounting section 30, as shown at solid line tab 64. The diagonal span has an upper end from which the upper segment extends laterally along a plateau at 88 for receiving the tab in the noted second position of mounting section 30, as shown at dashed line tab 64a.

In FIG. 12, the noted diagonal span is shown at 92 and has an upper end 94 from which the upper segment extends along a second diagonal 96 downwardly therefrom and forming an apex therewith at 94. Second diagonal 96 provides the noted upper segment for receiving tab 64 in the noted second position of mounting section 30, as shown at dashed line tab 64a. The lower end of diagonal span 92 provides the noted lower segment receiving the tab in the noted first downward position of mounting section 30, as shown at solid line tab 64.

Figure 13:
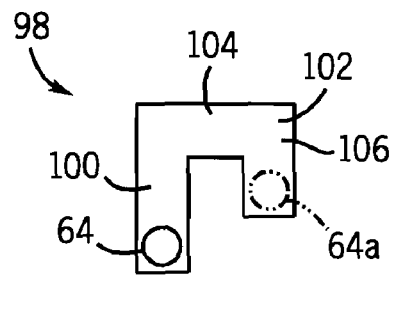
FIG. 13 is like FIG. 11 and shows a further embodiment.

In FIG. 13 the noted span has an inverted J-shape 98 including a longitudinally vertically extending leg 100 and an upper hook section 102. The upper hook section has a first portion 104 extending laterally from the upper end of leg 100, and has a second portion 106 extending downwardly from first portion 104. Second portion 106 provides the noted upper segment for receiving tab 64 in the noted second position of mounting section 30, as shown at dashed line tab 64a. The lower end of leg 100 provides the noted lower segment receiving the tab in the noted first downward position of mounting section 30, as shown at solid line tab 64.

Figure 14:
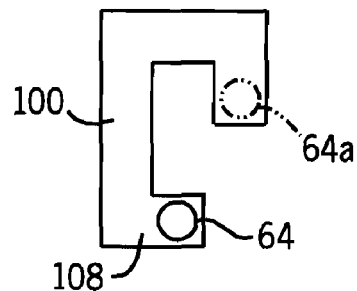
FIG. 14 is like FIG. 11 and shows a further embodiment.

In FIG. 14, the noted span of FIG. 13 has a lower portion 108 extending laterally from the lower end of leg 100 and providing the noted lower segment.

Figure 15:
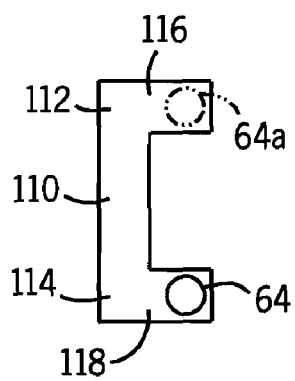
FIG. 15 is like FIG. 11 and shows a further embodiment.

In FIG. 15, the noted span 70 of FIG. 3 is provided by a longitudinally vertically extending leg 110 extending between upper and lower ends 112 and 114. Upper segment 116 extends laterally from the upper end, and lower segment 118 extends laterally from the lower end. In FIG. 3, the upper and lower segments extend in opposite lateral directions from the upper and lower ends of span 70. In FIG. 15, the upper and lower segments extend in the same lateral direction from the upper and lower ends of span 110.

Figure 16:
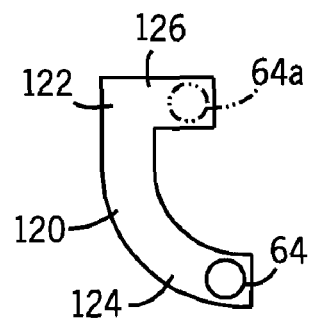
FIG. 16 is like FIG. 11 and shows a further embodiment.

In FIG. 16, the span 120 extends along a curvilinear path. The curvilinear path extents between upper and lower ends 122 and 124. Upper segment 126 extends laterally from upper end 122 and receives the tab. in the noted second upward position of mounting section 30, as shown at dashed-in tab 64a. Lower end 124 provides the noted lower segment receiving the tab in the noted first lowered position of mounting section 30, as shown at solid line tab 64.

Figure 17:
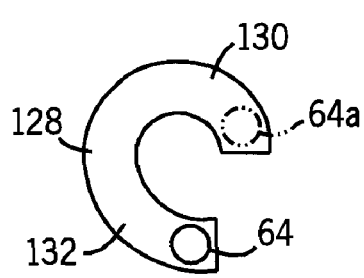
FIG. 17 is like FIG. 11 and shows a further embodiment.

In FIG. 17, the noted curvilinear path has a C-shape at 128 extending between distally opposite ends 130 and 132. The noted upper segment is provided by upper end 130 and receives the tab in the noted first upward position of mounting section 30, as shown at dashed-in tab 64a. The noted lower segment is provided by lower end 132 and receives the tab in the noted second lowered position of mounting section 30, as shown at solid line tab 64.

Figure 18:
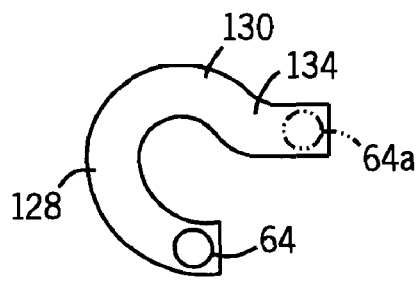
FIG. 18 is like FIG. 11 and shows a further embodiment.

In FIG. 18, upper segment 134 extends laterally from upper end 130 of C-shape curvilinear span 128.

Figure 5:
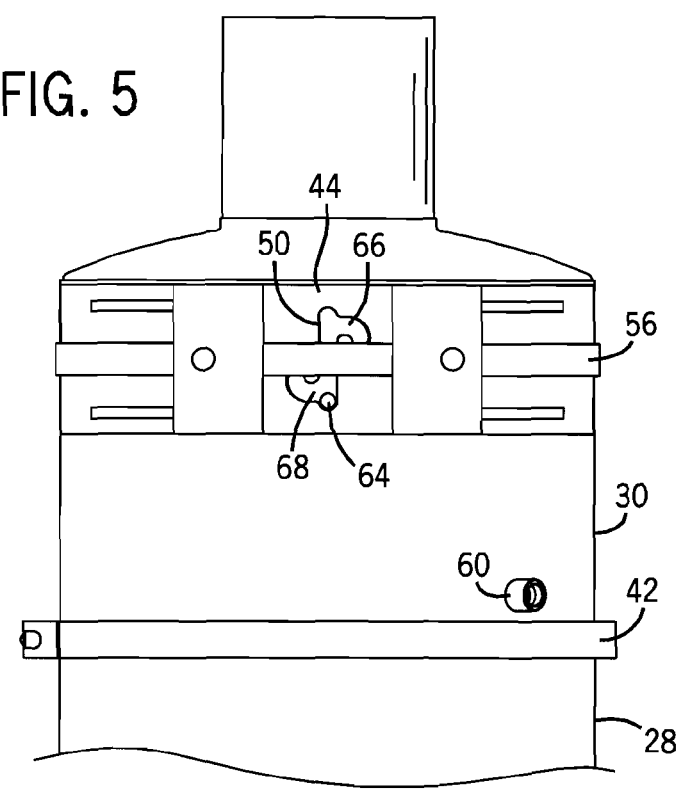
FIG. 5 is a side elevation view of a portion of FIG. 1.

361 The present system provides a method for servicing an exhaust aftertreatment assembly 20 by a single technician, namely, by moving mounting section 30 from the noted first position, FIGS. 4, 5, to the noted second position, FIGS. 6-8, and removing the aftertreatment element section, FIG. 9, for servicing of the latter all by the single technician. Prior to such removal, band clamps 42, 43, 56 are loosened as needed, all by the single technician. The method further involves re-installing a serviced aftertreatment element section, and moving mounting section 30. from the noted second upward position to the noted first lowered position locating mounting section 30 longitudinally along axis 24 and also locating mounting section 30 laterally thereof relative to axis 24, e.g. to a given angular or rotational position, to provide singular location mounting and alignment of mounting section 30 relative to support structure 48, all by the single technician without assistance of a second technician otherwise manually holding mounting section 30. After removal of aftertreatment element section 28, the aftertreatment element 26 therein is removed and cleaned remotely, or replaced. Upon re-installation, the noted singular location mounting and alignment of mounting section 30 is significant for proper alignment of sensors or ports such as 60 relative to support structure 48 and/or a vehicle or the like.

It is expected that various equivalents, alternatives and modifications are possible within the scope of the appended claims.

What is claimed is:

1. An exhaust aftertreatment assembly comprising an axially extending housing extending along a longitudinal axis and containing an aftertreatment element, said aftertreatment element being selected from the group consisting of at least one of a particulate soot filter element and a catalyst element, said housing having a plurality of housing sections including an aftertreatment element section and an adjacent mounting section separable from said aftertreatment element section at a service joint therebetween, a pair of brackets supporting said housing on support structure, a first of said brackets being mounted to said mounting section at an interface guide track assembly supporting said mounting section at a first position relative to said aftertreatment element section and in an engagement with said aftertreatment element section at said service joint, and a second position relative to said aftertreatment element section and separated from said aftertreatment element section to permit servicing of the latter, a first band clamp having a tightened condition securing said mounting section and said aftertreatment element section to each other at said service joint in said first position of said mounting section, and having a loosened condition permitting separation of said mounting section and said aftertreatment element section at said service joint in said second position of said mounting section, wherein said first mounting bracket supports both said mounting section and said aftertreatment element section in said first position of said mounting section, and supports said mounting section but not said aftertreatment element section in said second position of said mounting section, a second band clamp mounting said mounting section to said first bracket.

2. The exhaust aftertreatment assembly according to claim 1 wherein said mounting section is movable between said first and second positions in said loosened condition of said first band clamp, said first position locating said mounting section longitudinally along said axis and also locating said mounting section laterally relative to said axis to provide singular location mounting and alignment of said mounting section relative to said support structure by a single technician without assistance of a second technician, said second position supporting said mounting section independently of said aftertreatment element section and permitting removal of the latter by said technician without holding said mounting section by said single technician and without the assistance of a second technician.

3. An exhaust aftertreatment assembly comprising an axially extending housing extending alone a longitudinal axis and containing an aftertreatment element, said aftertreatment element being selected from the group consisting of at least one of a particulate soot filter element and a catalyst element, said housing having a plurality of housing sections including an aftertreatment element section and an adjacent mounting section separable from said aftertreatment element section at a service joint therebetween, a pair of brackets supporting said housing on support structure, a first of said brackets being mounted to said mounting section at an interface guide track assembly supporting said mounting section at a first position relative to said aftertreatment element section and in an engagement with said aftertreatment element section at said service joint, and a second position relative to said aftertreatment clement section and separated from said aftertreatment element section to permit servicing of the latter, a band clamp mounting said mounting section to said first bracket, wherein:
one of said mounting section and said aftertreatment element section is vertically spaced above the other of said mounting section and said aftertreatment element section in said second position of said mounting section;
said guide track assembly comprises a slot on one of said first bracket and said mounting section and a tab on the other of said first bracket and said mounting section, said tab extending laterally of said longitudinal axis and into said slot, said slot having an upper segment spaced above a lower segment, said upper and lower segments being joined by a span therebetween, one of said upper and lower segments receiving said tab in said first position of said mounting section, the other of said upper and lower segments receiving said tab in said second position of said mounting section;
said slot and said tab arc between said band clamp and said mounting section.

4. The exhaust aftertreatment assembly according to claim 3 wherein said slot is on said first bracket, and said tab is on said mounting section.

5. The exhaust aftertreatment assembly according to claim 4 wherein said slot has an inverted L-shape comprising a longitudinally extending first leg providing said span, and a laterally extending second leg providing said upper segment, and wherein said tab is received at the bottom of said first leg in said first position of said mounting section, and wherein said tab is received at the lateral end of said second leg distally opposite the top of said first leg in said second position of said mounting section.

6. The exhaust aftertreatment assembly according to claim 3 wherein said span extends diagonally between said upper and lower segments.

7. The exhaust aftertreatment assembly according to claim 6 wherein said diagonal span has a lower end at a corner providing said lower segment.

8. The exhaust aftertreatment assembly according to claim 6 wherein said diagonal span has an upper end from which said upper segment extends laterally along a plateau.

9. The exhaust aftertreatment assembly according to claim 6 wherein said diagonal span has an upper end from which said upper segment extends along a second diagonal downwardly therefrom and forming an apex therewith.

10. The exhaust aftertreatment assembly according to claim 3 wherein said span has an inverted J-shape comprising a longitudinally vertically extending leg and an upper hook section, said upper hook section having a first portion extending laterally from the upper end of said leg, and having a second portion extending downwardly from said first portion, said second portion providing said upper segment.

11. The exhaust aftertreatment assembly according to claim 10 wherein the lower end of said leg provides said lower segment.

12. The exhaust aftertreatment assembly according to claim 10 wherein said span has a lower portion extending laterally from the lower end of said leg and providing said lower segment.

13. The exhaust aftertreatment assembly according to claim 3 wherein said span comprises a longitudinally vertically extending leg extending between upper and lower ends, said upper segment extends laterally from said upper end, said lower segment extends laterally from said lower end.

14. The exhaust aftertreatment assembly according to claim 13 wherein said upper and lower segments extend in opposite lateral directions from said upper and lower ends, respectively.

15. The exhaust aftertreatment assembly according to claim 13 wherein said upper and lower segments extend in the same lateral direction from said upper and lower ends, respectively.

16. The exhaust aftertreatment assembly according to claim 3 wherein said span extends along a curvilinear path.

17. The exhaust aftertreatment assembly according to claim 16 wherein said curvilinear path extends between upper and lower ends, and said upper segment extends laterally from said upper end.

18. The exhaust aftertreatment assembly according to claim 16 wherein said lower end provides said lower segment.

19. The exhaust aftertreatment assembly according to claim 16 wherein said curvilinear path has a C-shape extending between distally opposite ends.

20. The exhaust aftertreatment assembly according to claim 19 wherein said upper segment is provided by one of said ends, and said lower segment is provided by the other of said ends.

21. The exhaust aftertreatment assembly according to claim 19 wherein said upper segment extends laterally from said upper end.

22. A method for servicing an exhaust aftertreatment assembly having an axially extending housing extending along a longitudinal axis and containing an aftertreatment element, said aftertreatment element being selected from the group consisting of at least one of a particulate soot filter and a catalyst element, said housing having a plurality of housing sections including an aftertreatment element section and an adjacent mounting section separable from said aftertreatment element section at a service joint therebetween, a pair of brackets supporting said housing on support structure, a first of said brackets being mounted to said mounting section at an interface guide track assembly supporting said mounting section at a first position relative to said aftertreatment element section and in engagement with said aftertreatment element section at said service joint, and a second position relative to said aftertreatment element section and separated from said aftertreatment element section to permit servicing of the latter, a first band clamp having a tightened condition securing said mounting section and said aftertreatment element section to each other at said service joint in said first position of said mounting section, and having a loosened condition permitting separation of said mounting section and said aftertreatment element section at said service joint in said second position of said mounting section, wherein said first mounting bracket supports both said mounting section and said aftertreatment element section in said first position of said mounting section, and supports said mounting section but not said aftertreatment element section in said second position of said mounting section, a second band clamp mounting said mounting section to said first bracket, said method comprising, by a single technician, loosening said first and second band clamps and moving said mounting section from said first position to said second position, and removing said aftertreatment element section for servicing of the latter, all by said single technician.

23. The method according to claim 22 comprising re-installing a serviced aftertreatment element section, and moving said mounting section from said second position to said first position locating said mounting section longitudinally along said axis and also locating said mounting section laterally thereof relative to said axis to provide singular location mounting and alignment of said mounting section relative to said support structure, all by said single technician without assistance of a second technician otherwise holding said mounting section, providing said guide track assembly with a slot on one of said first bracket and said mounting section and a tab on the other of said first bracket and said mounting section, said tab extending laterally of said longitudinal axis and into said slot, said slot having an upper segment spaced above a lower segment, said upper and lower segments being joined by a span therebetween, one of said upper and lower segments receiving said tab in said first position of said mounting section, the other of said upper and lower segments receiving said tab in said second position of said mounting section, said tab having a lateral height less than the lateral thickness of said slot, said method further comprising vertically moving said mounting section upon sufficient loosening of said second band clamp, with said vertical movement being enabled by said lateral height of said tab being less than the lateral thickness of said slot.

24. The exhaust aftertreatment assembly according to claim 3 wherein said tab has a lateral height less than the lateral thickness of said slot, to enable vertical movement of said mounting section upon sufficient loosening of said band clamp.

\* \* \* \* \*